United States Patent
Ruby et al.

[11] 3,886,477
[45] May 27, 1975

[54] CLOSED CYCLE DEVICE

[75] Inventors: Lowell E. Ruby; Donald L. Witt; Charles F. Staley, all of North Palm Beach, Fla.

[73] Assignee: United Aircraft Corporation, East Hartford, Conn.

[22] Filed: Oct. 29, 1968

[21] Appl. No.: 772,072

[52] U.S. Cl. ......... 331/94.5 G; 331/94.5 C; 330/4.3
[51] Int. Cl. ............................ H01s 3/04; H01s 1/06
[58] Field of Search .................................. 331/94.5

[56] References Cited
UNITED STATES PATENTS

| | | | |
|---|---|---|---|
| 2,832,666 | 4/1958 | Hertzberg et al. | 331/94.5 |
| 2,902,337 | 9/1959 | Glick et al. | 331/94.5 |
| 3,391,281 | 7/1968 | Eerkens | 331/94.5 |

OTHER PUBLICATIONS
Hurle et al., Electronic "Population Inversions by Fluid-Mechanical Techniques"- The Physics of Fluids, Vol. 8, No. 8, Sept., 1965, pp. 1601-1606.

*Primary Examiner*—Maynard R. Wilbur
*Assistant Examiner*—N. Moskowitz
*Attorney, Agent, or Firm*—Jack N. McCarthy

[57] ABSTRACT

This arrangement includes a gas dynamic laser wherein the lasing fluid is recirculated in a closed loop. The flow can be assumed to start with the lasing gas passing through a cascade of supersonic nozzles. This low pressure, high velocity gas is then passed through a lasing cavity where the lasing action takes place. The energy of the high velocity gas stream is converted back to static pressure in a supersonic diffuser. The diffuser is constructed with (1) variable geometry, and (2) provisions for bleeding off the boundary layer for improved efficiency. Downstream of the supersonic diffuser there is a heat exchanger which partially cools the gas in the loop. This partially cooled gas is then supplied to a compressor where the pressure and temperature are raised back to the level at the start of the flow. The lasing gas is directed from the exit of the compressor to a manifold upstream of the cascade of supersonic nozzles. The compressor only supplies a pressure rise equal to the pressure loss by inefficiencies in the nozzle, the supersonic diffuser and the pressure drop in the heat exchanger and plumbing. To provide for cooling of the compressor, the gas bled from the diffuser is cooled by a second heat exchanger and pumped back to compressor inlet pressure and introduced into the compressor for cooling. In steady state operation, both heat exchangers referred to above, are designed to regulate the nozzle inlet gas temperature by removing the amount of heat energy added by compressing minus the amount of energy extracted in the lasing beam and energy lost to the environment. The compressor and pumping means for cooling the compressor can be driven by any means desired.

13 Claims, 3 Drawing Figures

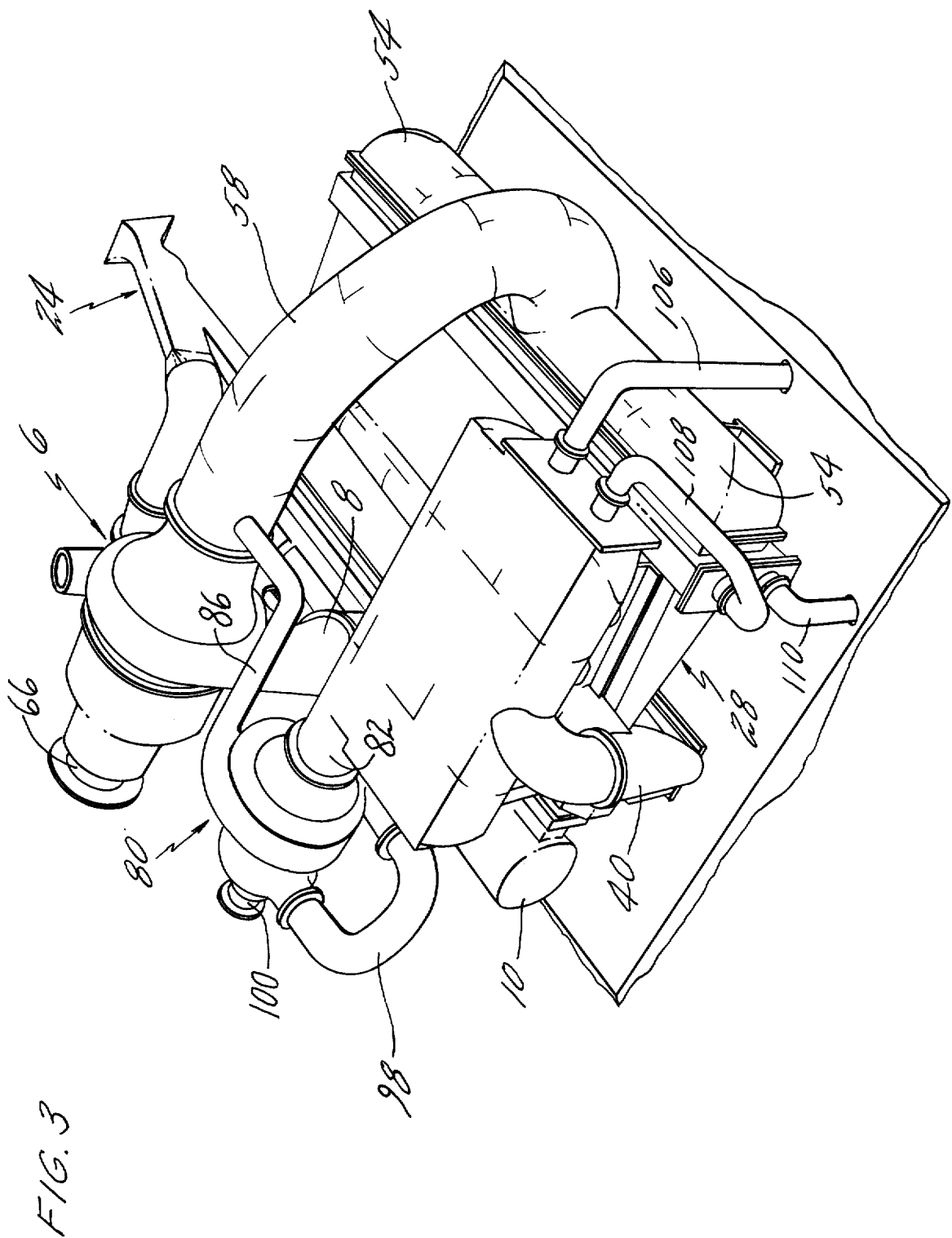

3,886,477

CLOSED CYCLE DEVICE

BACKGROUND OF THE INVENTION

This invention relates to gas dynamic lasers and particularly to their use in a closed cycle arrangement.

SUMMARY OF THE INVENTION

A primary object of the present invention is to provide a closed cycle system for a gas dynamic laser in which the working fluid is continually reused within the system.

In accordance with the present invention, a gas dynamic laser of high output is obtained with a reduction in fluid consumption as compared to open cycles, and this is done without a combustion process. The handling of toxic, reactive, cryogenic or dangerous materials can be avoided since, for example, the system can be powered by conventional prime movers using ordinary fuels.

In this system the gas bled from the diffuser for efficient operation is cooled externally of the closed loop, recompressed, and then reintroduced into the loop as coolant for the main compressor. The cycle is adaptable with increased compressor pressure ratio capability to multi-staging for increased cycle efficiency. This concept is also scalable to larger or smaller sizes.

BRIEF DESCRIPTION OF THE DRAWINGS

FIG. 3 is a perspective view of a proposed configuration for an actual construction.

DESCRIPTION OF THE PREFERRED EMBODIMENT

Figure 1:
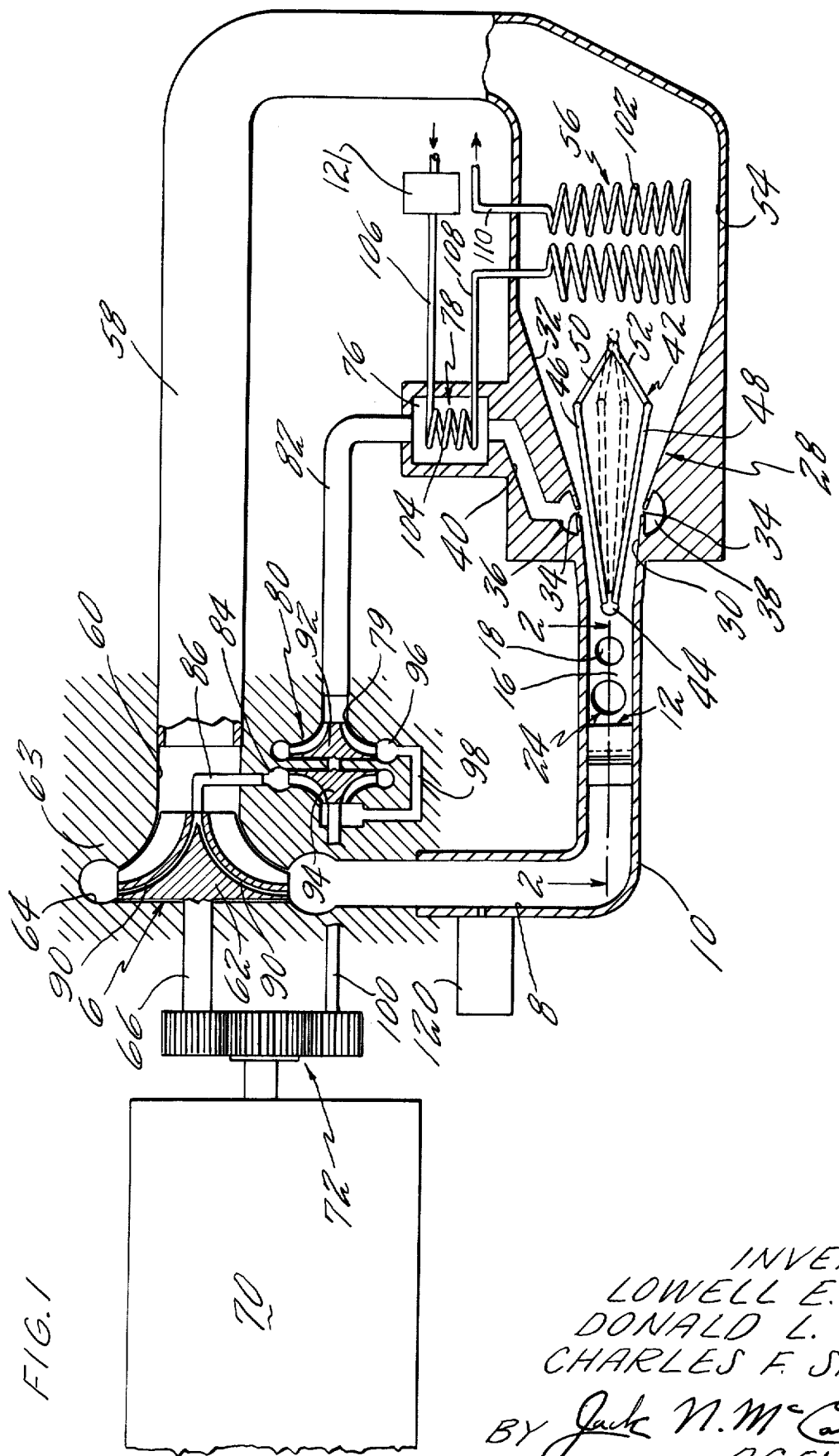
FIG. 1 is a schematic view showing the closed cycle system.
Figure 2:
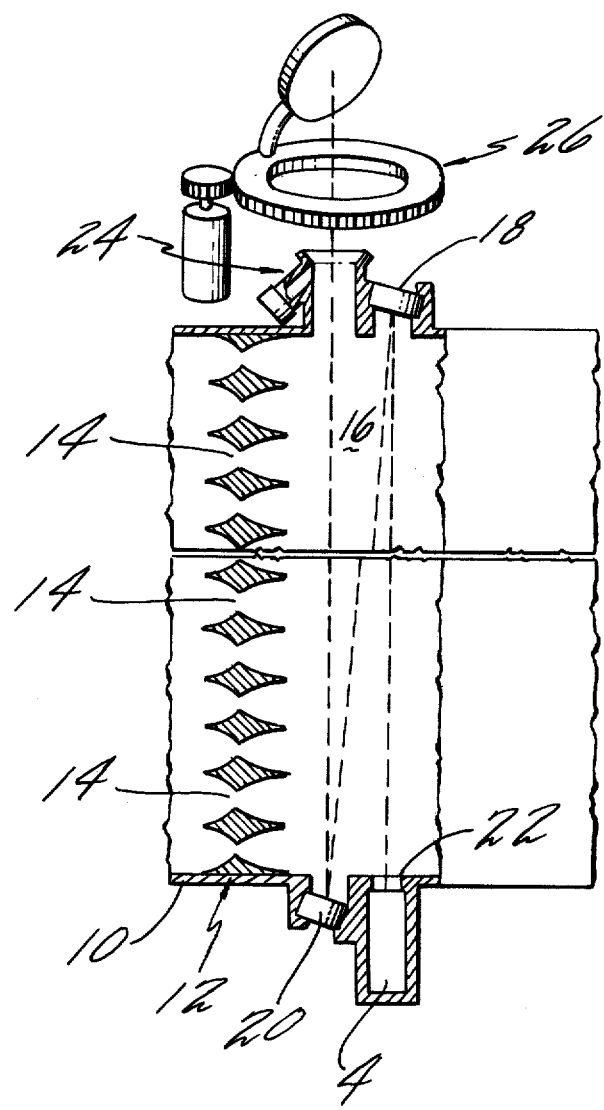
FIG. 2 is a schematic view taken along the line 2—2 of FIG. 1 showing the path of the laser beam.

As shown in FIG. 1, the closed cycle system has a closed loop for the gaseous working fluid path with one lasing cavity therein for a laser beam. A lasing gas for this device could consist of 14% $CO_2$, 85% $N_2$, and 1% $H_2O$, but this system is not limited to this gas composition. See application Ser. No. 731,659 filed May 23, 1968 to George H. McLafferty in this regard. A compressor unit 6 supplies the gaseous working fluid at the proper temperature and pressure through conduit means 8 to a manifold 10. Manifold 10 directs the fluid to the inlet of nozzle means 12. A nozzle means of this type showing a plurality of small nozzles 14 is disclosed in application Ser. No. 729,494 filed May 10, 1968 to Richard C. Mulready. The fluid is then expanded through the nozzle means 12 to a laser cavity 16 which is downstream of the exit of the nozzle means.

The lasing cavity, or region, 16 includes two reflecting devices 18 and 20 to provide an amplification of a laser beam directed thereinto by another gas laser device, or oscillator, 4. Other reflecting device or arrangements can be used, as desired. Opening 22 provides for a beam inlet from device 4 and an aerodynamic window 24 provides for a beam outlet. An aerodynamic window of the type referred to is disclosed in application Ser. No. 731,659 filed May 23, 1968 to George H. McLafferty. The laser output beam passing through the aerodynamic window 24 is directed into a turret 26 for final aiming. A turret of this type is disclosed in application Ser. No. 733,223 filed May 27, 1968 to William A. Morton and John I. Caporini. The lasing fluid then has its energy converted back to a higher static pressure by a supersonic diffuser 28.

The supersonic diffuser 28 is formed having a first diverging portion 30 and a second diverging portion 32. Bleed openings 34 are provided in the region where the diverging portions 30 and 32 meet. These openings on one side are connected by a manifold 36 and on the other side by a manifold 38. These manifolds 36 and 38 are connected to a passageway 40 for a purpose to be hereinafter described.

A movable center body 42 is located in the diffuser having a fixed nose 44 with movable sides 46, 48, 50 and 52. Control means not shown moves the center body between its expanded (solid lines) position and its contracted (dotted lines) position. It can be seen that the throat of the diffuser moves from a point adjacent the intersection of the diverging portion 30 and exit of the lasing cavity to a point adjacent the intersection of the diverging portion 30 and 32 when the center body moves from a contracted position to an expanded position. The center body is positioned in its contracted position for starting the flow through the closed loop and it is moved to its expanded position for its designed flow. In addition to this means for changing the area of the diffuser, the area may be varied by translating the body, or plug, 42, or by moving the outer diffuser walls 30 and 32.

The flow from the diffuser 28 enters a manifold 54 where heat exchanger 56 is located for a purpose to be hereinafter disclosed. The lasing fluid from manifold 54 is directed to the inlet 60 of the compressor 6 by a conduit means 58. The compressor 6 consists of an impeller 62 mounted for rotation in a housing 63. The outlet of the compressor forms a manifold 64 which exits into the conduit means 8. A shaft 66 is connected to the impeller 62 and extends to the exterior of housing 63. A power plant 70 drives the shaft 66 through gearing means 72.

Passageway 40 leading from manifolds 36 and 38 is connected to a chamber 76 containing a heat exchanger 78 which is similar to the heat exchanger 56, although smaller in size. Chamber 76 is connected to the inlet 79 of pump means 80 by conduit means 82. The exit of the pump means 80 comprises a manifold 84 which is connected to the impeller 62 to a conduit 86 so that the fluid leaving the pump means 80 is directed thereinto for cooling. In the embodiment shown, the fluid flows through passages 90 which are formed in the impeller 62 and which discharges the fluid back into the system. While this is shown as being at the outlet of the impeller, holes can be made through to an intermediate position or positions in the impeller hub or blades.

The pump means 80 comprises two impellers 92 and 94 mounted for rotation in a housing which is shown in a part of housing 63. These impellers are mounted back to back with the exit of impeller 92 being connected to a manifold 96 which is connected to the inlet of the impeller 94 by conduit means 98. As stated hereinbefore, the exit of this impeller is connected to a manifold 84.

The impellers 92 and 94 are connected to a shaft 100 which extends externally of the housing of the pump means 80 and this shaft is also driven by a power plant 70 through gearing means 72. The control means for operating the power plant 70 and for controlling the gearing means 72 to achieve proper rotation of the impellers 92 and 94 and impeller 62 are not shown but are within the skill of the art.

Heat exchanger 56 is shown as a helically wound pipe 102 and the heat exchanger 78 is shown as a small helically wound pipe 104. Conduit means 106 directs a cooling fluid to the pipe 104 while conduit means 108 interconnects pipe 104 to pipe 102. The exit of pipe 102 extends from the manifold 54 through a conduit means 110. The type and source of cooling fluid of these two heat exchangers does not form part of this invention. The heat exchangers 56 and 78 cool the gas by the amount of heat that was added by compressor means 62 and pump 80 minus the amount of energy extracted in the lasing beam and energy dissipated to the environment. The gas temperature at the inlet of nozzle means 12 is regulated by varying the coolant flow rate in heat exchangers 56 and 78 by means of a control 121. This control can be manually operated or automatically controlled by sensing the gas temperature in manifold 10.

For starting, the system could be charged with gas from a storage container 120, and during operation supplied therefrom with a small amount of makeup gas to overcome leakage and maintain proper cycle operation.

This closed loop system has been analyzed and a set of figures for a typical installation at steady state conditions follows. The compressor 6 has an efficiency of 84%, a pressure ratio of 1.85, a tip speed of 1,950 fps, and an input power of 26,700 HP. The temperature at the inlet to the nozzle means 12 is 2,700°R and the pressure is 400 psia, while the flow is at 148 lb/sec. The Mach number in the lasing cavity 16 would be 4.2. The efficiency of the diffuser 28 is 62%. In the passageway 40 the bleed gas pressure is 26 psia and the flow is at 22.3 lb/sec. Between the heat exchanger 56 and the inlet of the compressor 6 the lasing gas is approximately at 214 psia and at 2,430°R, while the flow is 125.7 lb/sec. In conduit means 82 the pressure is 24.4 psia and the temperature is 700°R. Pumping means 80 has an efficiency of 84%, a pressure ratio of 9.1, a tip speed of 1,550 fps, and an input power of 5,070 HP. In conduit 86 the lasing fluid temperature is 1,300°R and its pressure is 221 psia. The control 121 is regulating the coolant (water in this case) flow to maintain it at 100 lb/sec at 300 psia. The coolant exiting from conduit 110 is at 275 psia and 726°R. In this installation, 22,500 Btu/sec are rejected.

This system is shown with one nozzle-diffuser stage; however, the concept of multi-staging the nozzle-diffuser as discussed in application Ser. No. 731,659 can be applied to this system.

It is to be understood that the invention is not limited to the specific description above or specific figures shown, but may be used in other ways without departure from its spirit as defined by the following claims.

We claim:

1. A gas dynamic laser device having a closed cycle for the flow of a lasing fluid, said closed cycle including a supersonic nozzle means, a lasing region downstream of said nozzle means, reflecting means in said lasing region to form a lasing cavity, a diffuser means downstream of said lasing region, a heat exchanger downstream of said diffuser means for removing heat from a lasing fluid, compressor means for delivering the lasing fluid to said supersonic nozzle and maintaining flow throughout the cycle, and means for cooling said compressor means including means for directing a coolant fluid to said compressor means at a temperature lower than that of the lasing gas in the cycle at the location of said compressor means.

2. A gas dynamic laser device having a closed cycle for the flow of a lasing fluid, said closed cycle including a supersonic nozzle means, a lasing region downstream of said nozzle means, reflecting means in said lasing region to form a lasing cavity, a diffuser means downstream of said lasing region, a heat exchanger downstream of said diffuser means for removing heat from a lasing fluid, and compressor means for delivering the lasing fluid to said supersonic nozzle and maintaining flow throughout the cycle, and means for bleeding lasing gas from the diffuser means to cool the compressor means.

3. A device as set forth in claim 2 wherein said compressor means includes an impeller, and said bleeding means directs lasing gas into said impeller.

4. A device as set forth in claim 2 wherein said bleeding means includes means for cooling the lasing gas.

5. A device as set forth in claim 2 wherein said bleeding means includes pumping means.

6. A gas dynamic laser device having a closed cycle for the flow of a lasing fluid, said closed cycle including a supersonic nozzle means, a lasing region downstream of said nozzle means, reflecting means in said lasing region to form a lasing cavity, a diffuser means downstream of said lasing region, a heat exchanger downstream of said diffuser means for removing heat from a lasing fluid, and compressor means for delivering the lasing fluid to said supersonic nozzle and maintaining flow throughout the cycle, said diffuser means being variable.

7. A device as set forth in claim 6 wherein the diffuser means can be varied between a large area for starting and a small area for continuous flow at operating conditions.

8. A device as set forth in claim 4 wherein said cooling means includes a second heat exchanger for removing heat from the gas.

9. A device as set forth in claim 8 wherein both heat exchangers are in series and receive a coolant from a common source.

10. A method of forming a laser beam comprising the following steps:
    a. continuously pumping a lasing gas in a closed loop,
    b. heating the lasing gas,
    c. expanding the lasing gas to achieve a lasing region,
    d. extracting power from the lasing region in the form of a laser beam,
    e. diffusing the lasing gas to recover a portion of the total pressure,
    f. removing heat from the lasing gas downstream of where the lasing gas is diffused,
    g. bleeding lasing gas as it is diffused,
    h. cooling the bled lasing gas, and
    i. injecting the cooled bled lasing gas back into the loop where it is pumped.

11. A method as set forth in claim 10 wherein step (e) for diffusing is variable.

12. A gas dynamic laser device having a closed cycle for the flow of a lasing fluid, said closed cycle including a supersonic nozzle means, a lasing region downstream of said nozzle means, reflecting means in said lasing region to form a lasing cavity, said reflecting means providing for a laser output beam to be directed therefrom, a diffuser means downstream of said lasing region, a heat exchanger downstream of said diffuser means for removing heat from a lasing fluid, a compressor means for delivering the lasing fluid to said supersonic nozzle and maintaining flow throughout the cycle, said compressor means including an impeller, means for bleeding lasing gas from the diffuser means, passageway means connecting said bleeding means to said compressor means for directing lasing gas to said compressor means for cooling, pump means located in said passageway means for pumping the lasing gas therein.

13. A device as set forth in claim 12 wherein said impeller has passages therein, said passageway means directing said lasing gas to said passages, said passages exiting the cooling fluid back into said cycle.

* * * * *